United States Patent Office 3,300,464
Patented Jan. 24, 1967

3,300,464
REMOVAL OF CATALYST RESIDUES
FROM POLYMERS
Richard E. Dietz, Bartlesville, Okla., assignor to Phillips Petroleum Company, a corporation of Delaware
No Drawing. Filed Aug. 30, 1963, Ser. No. 305,869
17 Claims. (Cl. 260—93.7)

This invention relates to the removal of catalyst residues from polymer. In one aspect it relates to the removal of catalyst residues from polyolefins by utilizing a treating agent comparable in efficacy with and presenting less operating problems than other treating agents—such as the dicarbonyl compounds.

Various reactions for polymerizing olefins are described in literature, and the polymerizations usually are carried out in the presence of a catalyst. One such procedure for the production of olefin polymers involves contacting the monomer(s) with a catalyst system comprising a compound of a metal of Group IV, V, VI, or VIII, and a compound selected from the group consisting of organo-metal compounds, metal hydrides and metals of Group I, II, or III of the Periodic System.

One of the problems encountered with the polymers prepared by such processes concerns the presence of catalyst residues, or ash-forming ingredients, in the polymer. The "ash content" refers to the inorganic constituents which are present in the polymer in unidentified form and which produce ash when the polymer is burned. The presence of these catalyst residues in the polymer adversely affects the color and heat stability of the polymer as well as its electrical properties.

In slurry-type operations, substantial amounts of catalyst residues, particularly those from the transition component of the catalyst, are occluded in the polymer particles. Since in the solid state the polymer is insoluble, access to the occluded metal contaminants is not available to treating agents heretofore employed for catalyst removal in polymer solutions. Thus many of these agents are relatively ineffective for treating 1-olefin polymers in the solid state.

In addition, where metal halides are present in the catalyst, the use of a treating agent such as dicarbonyl compounds containing the group

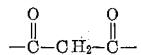

results in reaction of the treating agent with the metal halide with the evolution of a hydrogen halide. This is most usually hydrogen chloride since metal chlorides are usually employed as catalyst. HCl generation can lead to significant operation problems, especially in commercial equipment, in the nature of corrosion of conduits and vessels. Moreover, only moderate rates of extraction of catalyst residues are obtained when dicarbonyl-type chelating agents are used to sequester the catalyst residues. Also, it is believed that, at least in some instances, the presence of hydrogen chloride may tend to inhibit the chelating reaction.

It has further been observed in a continuous operation for treatment of the reactor effluent with certain of the dicarbonyl compound type of chelating agents alone, that the solid polymer particles have a distinct tendency to agglomerate and plug up the treating vessel.

It has heretofore been found that substantial reduction in catalyst residues can be realized by treatment with an alkylene oxide such as propylene oxide. However, while effective for many uses, there is frequently a need for 1-olefin polymers in which transition metal residues are reduced to below about 10 to 15 parts per million, which levels are difficult to realize with these reagents.

It is an object of the present invention to provide an improved process for producing polymers of mono-1-olefins containing a low catalyst residue.

Another object of the invention is to provide a process for treating polymers to remove or reduce catalyst residues associated therewith.

A still further object of the invention is to provide a process for polymerizing mono-1-olefins wherein the polymerization effluent containing liquid monomer and solid polymer is treated to reduce catalyst residues, such as transition metals to very low levels.

A still further object of the invention is to provide a process for treating a stream containing polymer suspended in a hydrocarbon diluent to remove or reduce catalyst residues without said removal or reduction being inhibited by undesirable hydrogen halides.

Yet another object of the invention is to prevent the agglomeration of solid polymer particles on the surfaces of the vessel in which the reactor effluent is treated to remove or reduce catalyst residues.

Accordingly, it is an object of this invention to provide a method of removing or reducing catalyst residues from or in a polymer wherein a halogen is a part of the catalyst complex.

Various other objects and advantages of this invention will become apparent to those skilled in the art from the following discussion and appended claims.

In accordance with the present invention, the foregoing objects are achieved, I have now discovered, by the use of a novel treating agent comprising an alkylene halohydrin having 2 to 8 carbon atoms, plus an alkylene oxide having from 2 to 8 carbon atoms. In the preferred range, the extraction results may be termed synergistic, in terms of the amount of either of the treating agent components required when employed alone. Moreover, it avoids the generation of corrosive hydrogen halides in the system, as are formed with other treating agents, such as dicarbonyl compounds. When operating in this manner, it has been found that the polymer product has a substantially reduced catalyst residue content.

In an alternative embodiment of the invention, alkylene oxide alone is charged, and a portion of this charge converted to alkylene halohydrin in situ by introducing a controlled amount of anhydrous hydrogen halide. When so operating, the amount of alkylene oxide will be sufficient to provide the desired amount of alkylene halohydrin, leaving unreacted the desired amount of alkylene oxide.

The mol ratio of the alkylene halohydrin component to the alkylene oxide is in the range of 2:1 to 1:2.

As mentioned hereinbefore, the polymers which are treated in accordance with the present process are prepared from mono-1-olefins. The present invention is particularly applicable to the treatment of polymers which are prepared by polymerizing mono-1-olefins and diolefins containing from 2 to not more than 20 carbon atoms. Examples of such monomers include ethylene, propylene, 1-butene, 1-pentene, 3-methyl-1-butene, 1-hexene, 1- heptene, 1-octene, 4-methyl-1-pentene, 3-methyl-1-hexene, 4-vinylcyclohexene, 1-eicosene, 4-ethyl-1-octadecene, 6-methyl-1-dodecene, 1,3-eicosadiene, 4,6-diethyl-1,3-decadiene, 4,5-dimethyl-1-octene, 1-hexadecene, 1,3-butadiene, isoprene, 2,3-dimethylbutadiene, 2-methoxybutadiene, and the like. This invention is particularly applicable to the treatment of polypropylene to remove catalyst residues. It is to be understood that mixtures of two or more monomers can be employed in the polymerization to produce copolymers which are then treated by the present process. Examples of such copolymers include ethylene-propylene and ethylene-1-butene.

This invention is applicable to the treatment of polymers prepared by the use of catalyst compositions comprising at least one component having at least one halogen atom attached to a metal atom. Such catalyst compositions often include two or more components, one of which is a compound of a metal selected from Groups IV, V, VI and VIII of the Periodic Table according to Mendeleef, the second component being selected from organometal compounds, metal hydrides, and metals of Groups I, II and III of the Periodic Table. Numerous examples of these catalyst compositions are well known in the art.

Examples of the second-mentioned component which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, methylaluminum dichloride, dimethylaluminum chloride, ethylaluminum dichloride, diethylaluminum chloride, di-n-butylaluminum bromide, isooctylaluminum diiodide, di-n-propylgallium fluoride, eicosylgallium dibromide, ditetradecylgallium fluoride, dicyclohexylgallium chloride, diphenylgallium bromide, diphenylindium chloride, octylindium fluoride, cyclohexylindium dibromide, 3-methylcyclohexylaluminum dichloride, 2-cyclohexylethylgallium dichloride, p-tolylberylliumiodide, di - (3 - phenyl - 1 - methylpropyl)indium fluoride, 2-(3-isopropylcyclohexyl)-ethylthallium dibromide, and the like.

The metal hydrides can include as specific examples, aluminum hydride, lithium aluminum hydride, barium hydride, gallium hydride, indium hydride, sodium aluminum hydride, potassium beryllium hydride.

The metals of the first, second and third groups are applicable as a class, the most important members being sodium, magnesium and aluminum.

The compounds of a metal of Groups IV, V, VI and VIII of the Periodic System include the oxides, hydrides, halides, oxyhalides, and the salts of organic acids, usually having twenty or less carbon atoms, such as formic acid, butyric acid, capric acid, palmitic acid, arachidic acid, and the like, of the said groups of metals, such as titanium, zirconium, chromium, thorium, molybdenum and vanadium.

The alcoholates of a metal of Group IV of the Periodic System which can be employed conform to the formula $X_nM(OR)_m$, where $m+n$ equals the valence of the metal M, X is a halogen, and R is an organic radical usually having twenty or less carbon atoms, and preferably being an alkyl, cycloalkyl or aryl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetracyclopentyl titanate, tetraethyl zirconate, tetramethyl zirconate, tetraisopropyl zirconate, tetraamyl zirconate, dichloro diethyl titanate $$(Cl_2Ti(OC_2H_5)_2)$$

monochloro triethyl titanate $(ClTi(OC_2H_5)_3)$ and dichloro diethyl zirconate $(Cl_2Zr(OC_2H_5)_2)$. Also included are such compounds as $Hf(OCH_3)_4$, $Th(OC_3H_7)_4$, $Th(OC_6H_5)_4$, $Cl_3Ti(OC_6H_4CH_3)$, $Zr(OC_4H_7)_4$, $$Cl_2Hf(OC_{10}H_{21})_2,$$

$Th(OC_6H_{13})_4$, and $Zr(OC_{12}H_{25})_4$.

A third catalyst component which can be used advantageously is an organic halide or metal halide where the organic radical has thirty or less carbon atoms, and is advantageously an alkyl, cycloalkyl or aryl group. Specific examples are ethyl bromide, ethyl trichloro titanium, bromobenzene, cyclohexyl chloride. Also applicable are an alkali metal or ammonium halide, an aluminum halide (where the catalyst also includes another metal compound such as a titanium compound), a halogen, a hydrogen halide, a complex hydride, a mixture of an organic halide and a metal, and a Grignard reagent.

A still more specific subgroup of catalysts where excellent color and low ash content are obtained by the practice of the invention include catalysts where an organometal compound is used in combination with a metal salt. The ratios of the catalyst components can vary widely, depending upon the particular charge used and operating conditions, say from 0.02 to 50 mols of the first component per mol of the second catalyst component. If a third component is present, the amount can vary from 0.02 to 50 mols per mol of the second component.

Examples of suitable catalyst systems in accordance with the foregoing disclosure are as follows:

(a) Aluminum trialkyls, e.g., triethylaluminum or triisobutylaluminum and the tetravalent metal halides of the type represented by titanium tetrachloride;

(b) An organic halide (such as ethyl bromide), a Group IV inorganic halide (such as titanium tetrachloride), and a low valence metal selected from the group consisting of alkali metals, beryllium, magnesium, zinc, cadmium, mercury, aluminum, gallium, indium and thallium, for example, magnesium, ethyl bromide and titanium tetrachloride, as such, or with the addition of metallic aluminum;

(c) A Group IV halide, for example, titanium tetrachloride and a low valence metal identified in (b), for example, sodium or magnesium;

(d) A mixture of titanium hydride and an aluminum alkyl halide, i.e., a mixture of titanium hydride and ethylaluminum sesquichloride;

(e) An organoaluminum halide such as diethylaluminum chloride and a trivalent metal halide such as titanium trichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and an organometal compound and halide, exemplified by triethylaluminum and diethylaluminum chloride;

(h) A mixture of a derivative selected from the oxides of molybdenum, alkali metal and ammonium molybdates, and an organometal halide exemplified by isobutylaluminum dichloride;

(i) A mixture of a derivative of iridium, platinum and osmium selected from the group consisting of halides, oxides and complex compounds of iridium, platinum and osmium, said complex compounds corresponding to the formula $M_xM'X_y$, wherein M is an alkali metal or an ammonium radical, M' is iridium, platinum or osmium, X is a halogen, and $y$ is at least 1 and the sum of $x$ and $y$ is equal to the valence of M' and a metallic organic compound exemplified by triethylaluminum, for example, iridium chloride and triethylaluminum or ethylaluminum sesquichloride;

(j) A mixture of a derivative of a Group IV metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium, and ammonia and an organo-metal compound exemplified by triethylaluminum, for example, molybdenum pentachloride and ethylaluminum dichloride;

(k) A chromyl halide and at least one of the following (1) a metal hydride or an organometal compound, (2) an organometal halide, and (3) a mixture of an organic halide and a metal, for example, chromyl chloride, ethyl bromide and magnesium;

(l) (1) a titanium derivative, (2) a complex hydride and (3) a halide of aluminum, for example, tetrabutyl titanate, lithium aluminum hydride and aluminum chloride;

(m) At least one halide of titanium, zirconium or hafnium and at least one hydride of lithium, sodium, potassium, rubidium, cesium, magnesium, calcium, strontium, barium, lanthanum or thorium, for example, zirconium tetrachloride and calcium hydride;

(n) (1) a hydrocarbon derivative of one of the metals, zinc, cadmium, mercury, and magnesium and (2) a member selected from the group consisting of halides of titanium, zirconium, vanadium and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(o) (1) a tri- or tetrahalide of titanium, zirconium, hafnium or germanium, (2) an organophosphorus-containing compound, and (3) at least one of the following (a) an organometal halide, (b) a mixture of an organic halide and a metal and (c) a complex hydride, for example, triethylaluminum, titanium tetrachloride and triphenyl phosphine;

(p) (1) a tri- or tetrahalide of titanium, zirconium, hafnium or germanium, (2) a peroxide of the formula R'OOR' where R' is a hydrogen, alkyl, aralkyl, alkaryl, cycloalkyl, acyl, alkyne, or aryl and (3) at least one of the following: (a) an organometal halide, (b) a mixture of an organic halide and a metal, and (c) a complex hydride; for example, ethylaluminum sesquichloride, titanium tetrachloride and benzoyl peroxide;

(q) (1) a tri- or tetrahalide of titanium, zirconium, hafnium or germanium, (2) a metal alkoxide, and (3) at least one of the following: (a) an organometal halide, (b) a mixture of an organic halide and a metal, and (c) a complex hydride; for example, ethylaluminum sesquichloride, aluminum ethylate and titanium tetrachloride;

(r) (1) a halide of titanium, zirconium, hafnium or germanium, (2) a hydride selected from the group consisting of hydrides of aluminum, gallium, indium, and thallium and complexes of said hydrides with alkali metal hydrides and (3) an organic halide; for example, titanium tetrachloride, lithium aluminum hydride and ethyl bromide;

(s) (1) a halide of titanium, zirconium, hafnium, or germanium, (2) carbides and acetylenic compounds, and (3) at least one of the following (a) an organometal halide, (b) a mixture of an organic halide and a free metal, and (c) a complex hydride; for example, ethylaluminum sesquichloride, titanium tetrachloride, and copper acetylide.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art.

One catalyst system which is preferred for use in the polymerization comprises a dialkylaluminum chloride and the reaction product of titanium tetrachloride and aluminum having the approximate formula $3TiCl_3 \cdot AlCl_3$.

The reaction of titanium tetrachloride and aluminum can be carried out at an elevated temperature, for example, at a temperature in the range of 100 to 600° F., preferably from 250 to 450° F.

The systems used for removal of catalyst residues by the method of the present invention include an alkylene halohydrin and an alkylene oxide.

The alkylene halohydrin component is selected from the group represented by the following structural formula:

HO—R—X in which X is a halogen selected from the group consisting of fluorine, chlorine and bromine, and is preferably the same as the halogen in the transition metal halide component of the catalyst system; and R is a divalent alkyl, cycloalkyl, aryl, cycloalkylalkyl, alkylcycloalkyl, aralkyl, or alkaryl radical having 2 to 8 carbon atoms, in which up to 3 additional halogen atoms and hydroxy radicals can be substituted in pairs for hydrogen atoms—i.e., for each halogen atoms substituted a hydroxy radical must also be substituted.

Typical of such compounds are:

1-chloro-2-ethanol,
1-chloro-2-propanol,
2-chloro-1-propanol,
1-chloro-3-propanol,
1-bromo-2-propanol,
2-bromo-1-propanol,
1-bromo-3-propanol,
1-fluoro-2-propanol,
2-fluoro-1-propanol,
1-fluoro-3-propanol,
1-chloro-2-butanol,
2-chloro-1-butanol,
1-chloro-3-butanol,
1,3-dichloro-2,4-dihydroxybutane,
1-chloro-2-pentanol,
2-chloro-1-pentanol,
1-chloro-3-pentanol,
1,3-dichloro-2,4-dihydroxypentane,
1-chloro-2-hexanol,
2-chloro-1-hexanol,
1-chloro-3-hexanol,
1,3,5-tribromo-2,4,6-trihydroxyhexane,
2-fluoro-3-heptanol,
3-bromo-5-heptanol,
1,3,5-trichloro-2,4,6-trihydroxyheptane,
1-chloro-4-octanol,
1,3-dichloro-5,6-dihydroxyoctane,
1,3,5,7-tetrachloro-2,4,6,8-tetrahydroxyoctane,
2,3-dichloro-2-hydroxymethyl-4-hydroxybutane,
1,3-dichloro-2,4-dihydroxy-2-ethylpentane,
2-chloro-2-cyclohexylethanol,
3-chlorocyclohexanol,
1,3-dihydroxy-2,4-dibromo-5-ethylcyclopentane,
3-chlorophenol,
1,3,5-trifluoro-2,4,6-trihydroxybenzene, and
2,3-dimethyl-4-chlorophenol, and the like.

The alkylene oxides used in the process of the present invention are compounds containing from 2 to 8 carbon atoms and which include in their molecular structure at least one oxirane group having the structure

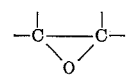

These compounds can be represented by the general formula

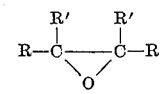

in which each R and each R' can be a hydrogen atom, an alkyl, cycloalkyl, or aryl group, or an epoxy-containing cyclic or alicyclic hydrocarbon group; and in which the R groups can be joined to form a carbocyclic group.

Typical compounds of this type include:

epoxyethane,
1,2-epoxypropane,
1,2-epoxybutane,
2,3-epoxybutane,
1,2:3,4-diepoxybutane,
1,4:4,5-diepoxypentane,
1,2:4,5:7,8-triepoxyoctane,
2,3-epoxy-2,3-dimethylbutane,
2,3-epoxy-2-methyl-3-ethylpentane,
epoxyethylbenzene,
epoxyethylcyclohexane,
epoxyethyl-3,4-epoxycyclohexane,
1,2-epoxycyclohexane,
2,3-epoxyethylcyclohexane,
1,2-epoxycyclopentane, and the like.

In the preparation of polymers of monoolefins, a presently preferred procedure involves conducting the reaction in the presence of a catalyst comprising an alkylaluminum halide compound and a titanium trihalide, the temperature being maintained at a level such that the polymer is formed as a finely divided solid. The reaction is conducted in a suitable reaction diluent. While the various hydrocarbons can be used as diluents, it is generally preferred that the polymerization be conducted as a mass operation in which the unreacted monomer acts as the diluent. By whatever means the polymerization is conducted, conditions are maintained such that the polymer is formed and recovered as a finely divided solid.

In the preferred practice of the invention the polymer is dispersed in a hydrocarbon diluent and treated in such dispersion. In many instances it is convenient to conduct the polymerization using the liquid monomer as the reaction diluent under conditions to provide a pulverulent solid polymer and treat the polymer for removal of catalyst in this diluent after termination of the polymerization. However, it is within the scope of the invention to replace the unreacted liquid monomer after polymerization has been terminated with another hydrocarbon material and conduct the extraction step therein. In any case, it is important to prevent contact of the system with air or moisture prior to and during the extraction step. Extraction is conducted in a temperature range such that the polymer is not degraded and for a sufficient period of time to reduce the undesired impurities to an ecceptable level. This time will vary with temperature, degree of mixing, etc., but will generally be from 1 minute to several hours, preferably from 10 to 100 minutes.

The treating agents can be introduced directly into the contact zone, or they can be added in solution in a hydrocarbon which is inert to the reactants. They can be added separately or can be combined before addition, with or without the solvent.

The polymer slurry may be passed to a filter, wherein the treated solid polymer is separated from the diluent, the latter also containing the catalyst residues. To remove any adhering liquid, the polymer is washed on the filter, removed and dried.

In a preferred embodiment of this invention, a polymer slurry, which has been treated according to the present invention to extract catalyst residues, passes to a washing step wherein the solid polymer undergoes further purification comprising contacting the polymer particles countercurrently with a hydrocarbon which is maintained in the liquid phase, preferably the same olefin used in the polymerization. Various hydrocarbons, particularly paraffinic hydrocarbons containing from 3 to 7 carbon atoms per molecule, such as pentane or heptane, can be employed as the wash liquid, although, as stated, it is preferred to utilize the monomer for this purpose.

The treated effluent is removed from the treating to the washing zone for the purification step just described. The overhead stream recovered from the wash zone contains monomer, soluble polymer, catalyst residues and a small amount of solid polymer for further separation. This stream can be separated into its various components if desired, and the purified monomer recycled. The bottom stream from the washing zone comprises a solid polymer substantially free of catalyst residues.

The present invention is particularly applicable to polypropylene prepared by polymerizing propylene in liquid propylene in the presence of a catalyst system comprising the reaction product of titanium tetrachloride and aluminum having the approximately formula $3TiCl_3 \cdot AlCl_3$ together with diethylaluminum chloride.

The alkylene oxide presently preferred is propylene oxide. The amount used will be in the range between 1 and 20 grams per gram of catalyst. The alkylene chlorohydrin presently preferred is propylene chlorohydrin. The amount used is in the range between 2 and 40 grams per gram of catalyst. These components preferably have the same number of carbon atoms and the same number of hydroxy, halogen, and epoxy groups. After incorporation of the catalyst removal system, the temperature is elevated into the range between 120 and 200° F. where it is maintained for from 10 minutes to 2 hours. When operating with liquid propylene as the diluent the upper limit of temperature will be limited to a level below the critical (198° F.).

While not essential, it is frequently desirable to conduct the polymerization in the presence of elemental hydrogen, charged in an amount of from 0.1 to 1.0 mol percent based on monomer. Polymerization temperature will be at a level such that the polymer is formed as a pulverulent solid. When operating with propylene, this temperature will preferably be in the range between 100 and 160° F.

While the method of this invention is particularly useful in treating dispersions of solid polymers to remove catalyst residues, it can also be employed to advantage to treat polymers in solution. In many polymerization systems, the reactor effluent comprises polymer in solution in a hydrocarbon solvent. Such a solution can be passed to a treating vessel wherein the extracting agent of this invention is added. The contact time is for a period sufficient to reduce the catalyst residues in the recovered polymer to an acceptable level, which may be from a very few minutes up to several hours. The polymer is then precipitated from the solution by suitable means such as reducing the temperature, adding a coagulating agent, etc. The polymer is separated from the liquid phase and can be further purified, if desired, by washing.

The effectiveness of propylene chlorohydrin in the process of the invention was a surprising and unexpected discovery. Isopropyl alcohol, typical of the aliphatic alcohols used as catalyst treating agents, not only failed to provide an adequate reduction in contaminants when used alone, but when used together with propylene oxide reduced the effectiveness of the latter drastically.

*Example*

Propylene was polymerized in a 1-gallon stainless steel reactor, using as the catalyst diethylaluminum chloride and the reaction product of titanium tetrachloride and aluminum having the approximate formula $3TiCl_3 \cdot AlCl_3$, the reaction being conducted in the presence of 0.5 mol percent hydrogen based on the propylene charge. In these runs, 3 liters of propylene was charged and reaction temperature was 120° F. At the end of the polymerization the treating system used was injected into the reactor and the temperature adjusted to the desired level. After the extraction period, the propylene phase was drained from the reactor, the polymer rinsed twice with 3-liter portions of fresh propylene, recovered, and dried; after which titanium, aluminum, and total ash content were determined. Data from these runs are shown in the table.

TABLE

| Run | Polymerization | | | | Extraction System Used | | | | | | Polymer Analysis, p.p.m. | | |
|---|---|---|---|---|---|---|---|---|---|---|---|---|---|
| | Catalyst, g. | | Temp., °F. | Time, Min. | Agent 1 | Level, ml. | Agent 2 | Level, ml. | Temp., °F. | Time, Min. | Ti | Al | Ash |
| | RP [a] | DEAC [b] | | | | | | | | | | | |
| 1a | 0.516 | 0.96 | 120 | 110 | PCH [c] | 5.0 | PO [d] | 5.5 | 160 | 60 | 2 | 39 | 61 |
| 1b | 0.452 | 0.57 | 120 | 110 | PCH | 1.1 | PO | 5.0 | 160 | 60 | 16 | | 70 |
| 1c | 0.451 | 0.57 | 120 | 110 | PCH | 1.4 | PO | 5.0 | 160 | 120 | 8 | | 70 |
| 1d | 0.453 | 0.84 | 120 | 110 | PCH | 2.3 | PO | 4.2 | 160 | 60 | 13 | | 81 |
| 1e | 0.472 | 0.59 | 120 | 110 | PCH | 2.9 | PO | 3.1 | 145 | 60 | 18 | | 80 |
| 1f | 0.447 | 0.57 | 120 | 110 | PCH | 1.4 | PO | 1.6 | 160 | 60 | 31 | | 60 |
| 2a | 0.352 | 0.66 | 120 | 120 | | | PO | 5.7 | 160 | 60 | 30 | 17 | 150 |
| 2b | 0.437 | 0.55 | 120 | 110 | | | PO | 10.0 | 160 | 60 | 45 | | 130 |
| 3a | 0.456 | 0.85 | 120 | 120 | IPA [e] | 50.0 | | | 160 | 120 | 75 | 363 | 1,250 |
| 3b | 0.439 | 0.55 | 120 | 110 | IPA | 10.0 | | | 160 | 60 | 390 | | 760 |
| 3c | 0.454 | 0.54 | 120 | 110 | IPA | 5.0 | | | 160 | 60 | 400 | | 700 |
| 4a | 0.442 | 0.83 | 120 | 120 | IPA | 50.0 | PO | 7.1 | 140 | 120 | 148 | 270 | 1,000 |
| 4b | 0.441 | 0.82 | 120 | 110 | IPA | 5.0 | PO | 5.1 | 160 | 60 | 65 | 23 | 232 |
| 4c | 0.462 | 0.86 | 120 | 110 | IPA | 5.0 | PO | 5.2 | 160 | 60 | 61 | 30 | 178 |
| 5a | 0.469 | 0.88 | 120 | 110 | PCH | 10.0 | | | 160 | 60 | 295 | 23 | 669 |
| 5b | 0.439 | 0.81 | 120 | 110 | PCH | 10.0 | | | 160 | 60 | 395 | 37 | 743 |
| 5c | 0.413 | 0.52 | 120 | 110 | PCH | 5.0 | | | 160 | 60 | 378 | | 650 |
| 6 | 0.468 | 0.58 | 120 | 110 | PCH | 5.0 | IPA | 5.0 | 160 | 60 | 400 | | 550 |

[a] Reaction product of $TiCl_4$ and Al having the approximate formula $3TiCl_3 \cdot AlCl_3$.
[b] Diethylaluminum chloride.
[c] Propylene chlorohydrin mixture containing about 80 mol percent $CH_3.CHOH.CH_2Cl$ (1-chloro-2-propanol) and 20 mol percent $CH_3.CHCl.CH_2OH$ (2-chloro-1-propanol).
[d] 1,2-propylene oxide (1,2-epoxypropane).
[e] Isopropyl alcohol.

When a mixture of propylene chlorohydrin and propylene oxide were employed as extraction agents for the catalyst residues, titanium, aluminum, and total ash content were significantly reduced to within acceptable levels. Moreover, HCl evolution was not observed. (See Runs 1a to 1f.

Propylene oxide alone was moderately effective in reducing total ash content. However, the transition metal residues, i.e., titanium, were significantly higher than with the novel two-component treating agent. (See Runs 2a and 2b.) In certain uses of 1-olefin polymers, this metal residue level would be unacceptable.

Isopropyl alcohol resulted in very high levels of total ash and titanium. (See Runs 3a to 3c.)

Isopropyl alcohol, mixed with propylene oxide, gave somewhat better results than isopropyl alcohol alone. However, the mixture was markedly inferior to propylene oxide alone. (See Runs 4a to 4c.)

Propylene chlorohydrin when used alone was relatively ineffective both in terms of total ash and titanium content. (See Runs 5a to 5c.)

Propylene chlorohydrin, mixed with another agent, such as isopropyl alcohol, was relatively ineffective. (See Run 6.)

In sum, the novel mixture of propylene chlorohydrin and propylene oxide when used as a catalyst extraction agent may be said to have given a synergistic result, in terms of the equivalent amounts of either of these treating agent components required when employed alone. Used singly, they gave substantially inferior results.

Reasonable variations and modifications are possible within the scope of the foregoing disclosure, the drawings and the appended claims to the invention.

I claim:

1. A method of removing impurities from a polymer prepared by catalytic polymerization in the presence of a catalyst having at least two essential components, one of said components being a metal compound selected from the group consisting of Group IV, Group V, Group VI and Group VIII metal compounds, and another of said components being selected from the group consisting of organometal compounds, metal hydrides, and metals of Groups I, II, and III, at least one of said components containing at least one halogen atom attached to a metal atom, which comprises: contacting said polymer present in a hydrocarbon diluent, while the latter is under conditions such that said diluent remains in liquid phase, with a treating agent comprising an alkylene halohydrin compound selected from the group consisting of the following structural formula:

$$HO-R-X$$

in which X is a halogen atom selected from the group consisting of fluorine, chlorine, and bromine; and R is a divalent alkyl, cycloalkyl, aryl, cycloalkylalkyl, akylcycloalkyl, aralkyl, or alkaryl radical having 2 to 8 carbon atoms, in which up to 3 additional halogen atoms and hydroxy radicals can be substituted in pairs for hydrogen atoms and an alkylene oxide having from 2 to 8 carbon atoms; and separating said polymer from the resulting mixture substantially free of catalyst residue.

2. The process according to claim 1 in which said treating agent comprises an alkylene halohydrin selected from the group consisting of 1-chloro-2-ethanol,
1-chloro-2-propanol,
2-chloro-1-propanol,
1-chloro-3-propanol,
1-bromo-2-propanol,
2-bromo-1-propanol,
1-bromo-3-propanol,
1-fluoro-2-propanol,
2-fluoro-1-propanol,
1-fluoro-3-propanol,
1-chloro-2-butanol,
2-chloro-1-butanol,
1-chloro-3-butanol,
1,3-dichloro-2,4-dihydroxybutane,
1-chloro-2-pentanol,
2-chloro-1-pentanol,
1-chloro-3-pentanol,
1,3-dichloro-2,4-dihydroxypentane,
1-chloro-2-hexanol,
2-chloro-1-hexanol,
1-chloro-3-hexanol,
1,3,5-tribromo-2,4,6-trihydroxyhexane,
2-fluoro-3-heptanol,
3-bromo-5-heptanol,
1,3,5-trichloro-2,4,6-trihydroxyheptane,
1-chloro-4-octanol,
1,3-dichloro-5,6-dihydroxyoctane,
1,3,5,7-tetrachloro-2,4,6,8-tetrahydroxyoctane,
2,3-dichloro-2-hydroxymethyl-4-hydroxybutane,
1,3-dichloro-2,4-dihydroxy-2-ethylpentane,
2-chloro-2-cyclohexylethanol,
3-chlorocyclohexanol, 1,3-dihydroxy-2,4-dibromo-5-ethylcyclopentane, 3-chlorophenol, 1,3,5-trifluoro-2,4,6-trihydroxybenzene, and 2,3-dimethyl-4-chlorophenol.

3. The process according to claim 1 in which said alkylene oxide is selected from the group consisting of
epoxyethane,
1,2-epoxypropane,
1,2-epoxybutane,
2,3-epoxybutane,
1,2:3,4-diepoxybutane,
1,2:4,5-diepoxypentane,
1,2:4,5:7,8-triepoxyoctane,
2,3-epoxy-2,3-dimethylbutane,
2,3-epoxy-2-methyl-3-ethylpentane,
epoxyethylbenzene (styrene oxide),
epoxyethylcyclohexane,
epoxyethyl-3,4-epoxycyclohexane,
1,2-epoxycyclohexane,
2,3-epoxyethylcyclohexane, and
1,2-epoxycyclopentane.

4. The method of removing impurities from a polymer prepared by catalytic polymerization in the presence of a catalyst having at least two essential components, one of said components being a metal compound selected from the group consisting of Group IV, Group V, Group VI, and Group VIII metal compounds, and another of said components being selected from the group consisting of organometal compounds, metal hydrides, and metals of Groups I, II and III, and at least one of said components containing at least one halogen atom attached to a metal atom, which comprises contacting said polymer dispersed in a hydrocarbon diluent, while the latter is under conditions such that said diluent remains in liquid phase, with a treating agent comprising an alkylene halohydrin selected from the group consisting of 1-chloro-2-ethanol, 1-chloro-2-propanol, 2-chloro-1-propanol, 1-chloro-3-propanol, 1-bromo-2-propanol, 2-bromo-1-propanol, 1-bromo-3-propanol, 1-fluoro-2-propanol, 2-fluoro-1-propanol, 1-fluoro-3-propanol, 1-chloro-2-butanol, 2-chloro-1-butanol, 1-chloro-3-butanol, 1,3-dichloro-2,4-dihydroxybutane, 1-chloro-2-pentanol, 2-chloro-1-pentanol, 1-chloro-3-pentanol, 1,3-dichloro-2,4-dihydroxypentane, 1-chloro-2-hexanol, 2-chloro-1-hexanol, 1-chloro-3-hexanol, 1,3,5-tribromo-2,4,-trihydroxyhexane, 2-fluoro-3-heptanol, 3-bromo-5-heptanol, 1,3,5-trichloro-2,4,6-trihydroxyheptane, 1-chloro-4-octanol, 1,3-dichloro-5,6-dihydroxyoctane, 1,3,5,7-tetrachloro-2,4,6,8-tetrahydroxyoctane, 2,3-dichloro-2-hydroxymethyl-4-hydroxybutane, 1,3-dichloro-2,4-dihydroxy-2-ethylpentane, 2-chloro-2-cyclohexylethanol, 3-chlorocyclohexanol, 1,3-dihydroxy-2,4-dibromo-5-ethylcyclopentane, 3-chlorophenol, 1,3,5-trifluoro-2,4,6-trihydroxybenzene, and 2,3-dimethyl-4-chlorophenol; and an alkylene oxide selected from the group consisting of epoxyethane, 1,2-epoxypropane, 1,2-epoxybutane, 2,3-epoxybutane, 1,2:3,4-diepoxybutane, 1,2:4,5-diepoxypentane, 1,2:4,5:7,8-triepoxyoctane, 2,3-epoxy-2,3-dimethylbutane, 2,3-epoxy-2-methyl-3-ethylpentane, epoxyethylbenzene, epoxyethylcyclohexane, epoxyethyl-3,4-epoxycyclohexane, 1,2-epoxycyclohexane, 2,3-epoxyethylcyclohexane, and 1,2-epoxycyclopentane, and separating said polymer from the resulting mixture substantially free of catalyst residues.

5. In a process for the removal of catalyst residues from polymers wherein a mono-1-olefin is contacted with a catalyst comprising an organometal compound and a metal halide under polymerization conditions so as to form solid polymer in particle form, and wherein an effluent containing solid polymer, catalyst residues, and olefin is recovered from said polymerization; the improvement which comprises introducing said effluent into a contact zone; mixing said effluent in said contact zone with a treating agent comprising an alkylene halohydrin selected from the group consisting of 1-chloro-2-ethanol, 1-chloro-2-propanol, 2-chloro-1-propanol, 1-chloro-3-propanol, 1-bromo-2-propanol, 2-bromo-1-propanol, 1-bromo-3-propanol, 1-fluoro-2-propanol, 2-fluoro-1-propanol, 1-fluoro-3-propanol, 1-chloro-2-butanol, 2-chloro-1-butanol, 1-chloro-3-butanol, 1,3-dichloro-2,4-dihydroxybutane, 1-chloro-2-pentanol, 2-chloro-1-pentanol, 1-chloro-3-pentanol, 1,3-dichloro-2,4-dihydroxypentane, 1-chloro-2-hexanol, 2-chloro-1-hexanol, 1-chloro-3-hexanol, 1,3,5-tribromo-2,4,6-trihydroxyhexane, 2-fluoro-3-heptanol, 3-bromo-5-heptanol, 1,3,5-trichloro-2,4,6-trihydroxyheptane, 1-chloro-4-octanol, 1,3-dichloro-5,6-dihydroxyoctane, 1,3,5,7-tetrachloro-2,4,6,8-tetrahydroxyoctane, 2,3-dichloro-2-hydroxymethyl-4-hydroxybutane, 1,3-dichloro-2,4-dihydroxy-2-ethylpentane, 2-chloro-2-cyclohexylethanol, 3-chlorocyclohexanol, 1,3-dihydroxy-2,4-dibromo-5-ethylcyclopentane, 3-chlorophenol, 1,3,5-trifluoro-2,4,6-trihydroxybenzene, and 2,3-dimethyl-4-chlorophenol; and an alkylene oxide having from two to eight carbon atoms under conditions such that said olefin remains in liquid phase; recovering the thus treated effluent; washing said treated effluent by contacting same in countercurrent flow with a hydrocarbon having from 3 to 7 carbon atoms under conditions such that said hydrocarbon and said olefin remain in liquid phase; and thereafter recovering a solid polymer substantially free of catalyst residues.

6. The process according to claim 5 in which said alkylene halohydrin is a mixture of 1-chloro-2-propanol and 2-chloro-1-propanol, and said alkylene oxide is selected from the group consisting of epoxyethane, 1,2-epoxypropane, 1,2-epoxybutane, 2,3-epoxybutane, 1,2:3,4-diepoxybutane, 1,2:4,5-diepoxypentane, 1,2:4,5:7,8-triepoxyoctane, 2,3-epoxy-2,3-dimethylbutane, 2,3-epoxy-2-methyl-3-ethylpentane, epoxyethylbenzene (styrene oxide), epoxyethylcyclohexane, epoxyethyl-3,4-epoxycyclohexane, 1,2-epoxycyclohexane, 2,3-epoxyethylcyclohexane, and 1,2-epoxycyclopentane.

7. The process according to claim 5 in which said alkylene halohydrin is 1-chloro-2-propanol and said alkylene oxide is selected from the group consisting of epoxyethane, 1,2-epoxypropane, 1,2-epoxybutane, 2,3-epoxybutane, 1,2:3,4-diepoxybutane, 1,2:4,5-diepoxypentane, 1,2:4,5:7,8-triepoxyoctane, 2,3-epoxy-2,3-dimethylbutane, 2,3-epoxy-2-methyl-3-ethylpentane, epoxyethylbenzene (styrene oxide), epoxyethylcyclohexane, epoxyethyl-3,4-epoxycyclohexane, 1,2-epoxycyclohexane, 2,3-epoxyethylcyclohexane, and 1,2-epoxycyclopentane.

8. The process according to claim 5 in which said alkylene halohydrin comprises a mixture of 1-chloro-2-propanol and 2-chloro-1-propanol, and said alkylene oxide is 1,2-epoxypropane.

9. In a polymer recovery process wherein liquid propylene is contacted with a catalyst comprising an organometal compound and a metal halide under polymerization conditions so as to form solid polymer in particle form and wherein an effluent containing solid polypropylene, catalyst residues, and propylene is recovered from said polymerization; the improvement which comprises introducing said effluent into a contact zone; mixing said effluent in said contact zone with a treating agent comprising a mixture of 1-chloro-2-propanol and 2-chloro-1-propanol, and 1,2-epoxypropane, under conditions such that said effluent remains in liquid phase; recovering the thus treated effluent; washing said treated effluent by contacting same in countercurrent flow with a hydrocarbon having from 3 to 7 carbon atoms under conditions such that said hydrocarbon and said olefin remain in liquid phase; and thereafter recovering a solid polymer substantially free of catalyst residues.

10. In a mass polymerization process wherein liquid propylene is contacted with a catalyst comprising alkyl aluminum compound and the reaction product of titanium tetrachloride and aluminum under polymerization conditions so as to form solid polymer in particle form, and wherein an effluent containing solid polypropylene, catalyst residues, and liquid propylene is recovered from said polymerization; the improvement which comprises introducing said effluent into a contact zone; mixing said effluent in said contact zone with a treating agent comprising a mixture of 1-chloro-2-propanol, 2-chloro-1-propanol and 1,2-epoxypropane, under conditions such that said hydrocarbon and said olefin remain in liquid phase; and thereafter recovering a solid polymer substantially free of catalyst residues.

11. In a mass polymerization process wherein liquid propylene is contacted with a catalyst comprising an organometal compound and a metal halide under polymerization conditions so as to form solid polymer in particle form and wherein an effluent containing solid polymer, catalyst residues, and liquid olefin is recovered from said polymerization; the improvement which comprises introducing said effluent into a contact zone; mixing said effluent in said contact zone with a treating agent comprising 1-chloro-2-propanol, and 1,2-epoxypropane, under conditions such that said effluent remains in liquid phase; recovering the thus treated effluent; washing said treated effluent by contacting same in countercurrent flow with a hydrocarbon having from 3 to 7 carbon atoms under conditions such that said hydrocarbon and said olefin remain in liquid phase; and thereafter recovering a solid polymer substantially free of catalyst residues.

12. A treating agent useful for removal of catalyst impurities from a polymer comprising an alkylene halohydrin selected from the group consisting of the following structural formula

HO—R—X in which X is a halogen atom selected from the group consisting of fluorine, chlorine, and bromine, and R is a divalent alkyl, cycloalkyl, aryl, cycloalkylalkyl, alkylcycloalkyl, aralkyl, or alkaryl radical having 2 to 8 carbon atoms, in which up to 3 additional halogen atoms and hydroxy radicals can be substituted in pairs for hydrogen atoms, and an alkylene oxide having from 2 to 8 carbon atoms.

13. A treating agent useful for removal of catalyst impurities from a polymer comprising: an alkylene halohydrin and an alkylene oxide selected from the group consisting of epoxyethane, 1,2-epoxypropane, 1,2-epoxybutane, 2,3-epoxybutane, 1,2:3,4-diepoxybutane, 1,2:4,5-diepoxypentane, 1,2:4,5:7,8-triepoxyoctane, 2,3-epoxy-2,3-dimethylbutane, 2,3 - epoxy-2-methyl - 3 - ethylpentane, epoxyethylbenzene (styrene oxide), epoxyethylcyclohexane, epoxyethyl-3,4-epoxycyclohexane, 1,2 - epoxycyclohexane, 2,3-epoxyethylcyclohexane, and 1,2-epoxycyclopentane.

14. A treating agent useful for removal of catalyst impurities from a polymer comprising an alkylene halohydrin and an alkylene oxide having from 2 to 8 carbon atoms, the mol ratio of said halohydrin compound to said alkylene oxide being in the range of 2:1 to 1:2.

15. A treating agent useful for removal of catalyst impurities from a polymer comprising: 1-chloro-2-propanol, 2-chloro-1-propanol and 1,2-epoxypropane.

16. A treating agent useful for removal of catalyst impurities from a polymer comprising: 1-chloro-2-propanol and 1,2-epoxypropane.

17. A treating agent useful for removal of catalyst impurities from a polymer comprising: 1-chloro-2-propanol, 2-chloro-1-propanol, and 1,2-epoxypropane, the mol ratio of the halohydrins to said alkylene oxide being in the range 2:1 to 1:2.

References Cited by the Examiner
UNITED STATES PATENTS
2,974,132   3/1961   Jacobi _____ 260—94.9

JOSEPH L. SCHOFER, *Primary Examiner.*

JAMES A. SEIDLECK, *Examiner.*

L. EDELMAN, *Assistant Examiner.*

UNITED STATES PATENT OFFICE
CERTIFICATE OF CORRECTION

Patent No. 3,300,464                        January 24, 1967

Richard E. Dietz

It is hereby certified that error appears in the above numbered patent requiring correction and that the said Letters Patent should read as corrected below.

Column 11, line 46, for "1,3,5-tribromo-2,4,-trihydroxyhexane" read -- 1,3,5-tribromo-2,4,6-trihydroxyhexane --.

Signed and sealed this 14th day of November 1967.

(SEAL)
Attest:

Edward M. Fletcher, Jr.
Attesting Officer

EDWARD J. BRENNER
Commissioner of Patents